(12) United States Patent
Grant

(10) Patent No.: US 6,607,596 B2
(45) Date of Patent: Aug. 19, 2003

(54) PAINTLESS FILM EDGE SEALING TOOL

(75) Inventor: William S. Grant, Azle, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 66 days.

(21) Appl. No.: 09/901,349

(22) Filed: Jul. 9, 2001

(65) Prior Publication Data

US 2003/0008076 A1 Jan. 9, 2003

(51) Int. Cl.⁷ .............................................. B05C 17/035
(52) U.S. Cl. .................... 118/211; 118/212; 118/225; 118/244; 118/255; 118/259; 401/208; 401/218; 401/219
(58) Field of Search ................... 118/211, 212, 118/225, 244, 255, 259; 401/208, 218, 219, 220; 156/578; 427/207.1

(56) References Cited

U.S. PATENT DOCUMENTS

| | | |
|---|---|---|
| 1,988,710 A | 1/1935 | Striper |
| 2,041,022 A | 11/1936 | Rasmussen |
| 2,122,858 A | 7/1938 | Coombs |
| 2,581,848 A * | 1/1952 | Ettl ............................ 401/208 |
| 2,762,071 A * | 9/1956 | Eggert ........................ 401/208 |
| 3,797,454 A * | 3/1974 | Kalikow ..................... 118/247 |
| 4,212,556 A | 7/1980 | Kohler |
| 4,258,657 A * | 3/1981 | Fritz ........................... 118/710 |
| 5,443,683 A * | 8/1995 | Garrett ....................... 156/578 |

* cited by examiner

Primary Examiner—Laura Edwards
(74) Attorney, Agent, or Firm—Jackson Walker LLP

(57) ABSTRACT

An apparatus and method for securing an edge of a paintless type film gore. A fluid sealant material is beaded along the edge of the gore using a bead striping apparatus. The striping apparatus comprises a serrated wheel rotatably coupled to a housing which contains the fluid sealant. The sealant is transferred to the wheel and subsequently is transferred the gore edge as the wheel is rolled.

8 Claims, 2 Drawing Sheets

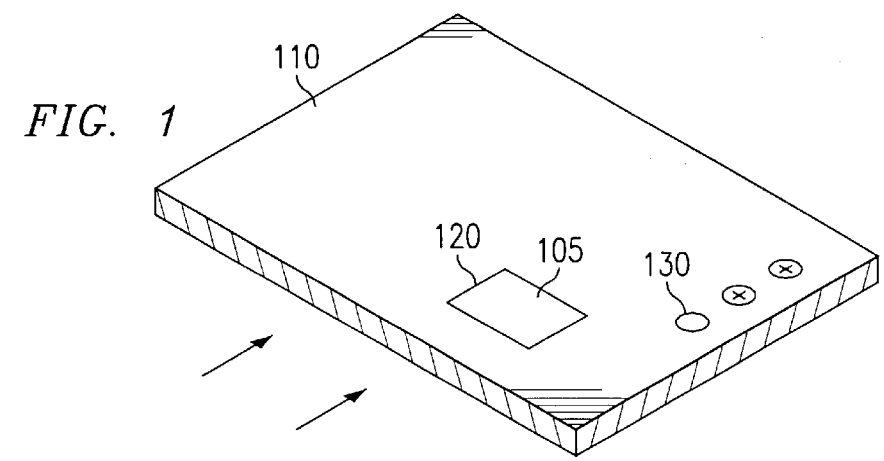
FIG. 1
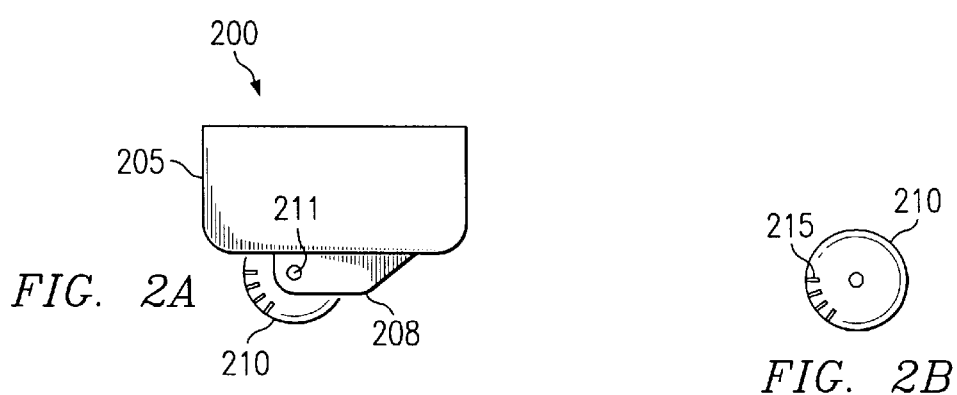
FIG. 2A
FIG. 2B
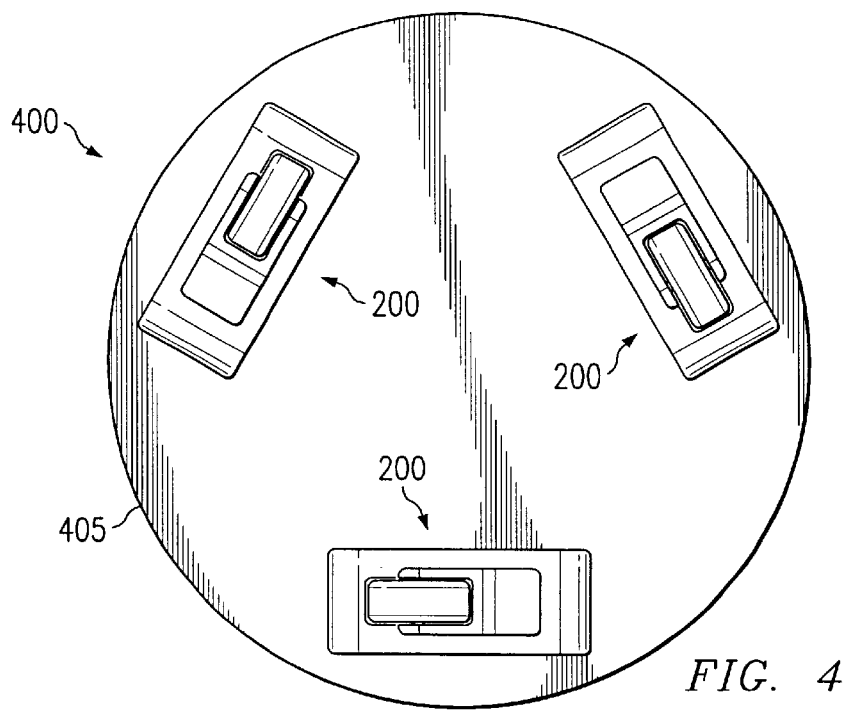
FIG. 4

PAINTLESS FILM EDGE SEALING TOOL

BACKGROUND OF THE INVENTION

1. Technical Field of the Invention

The present invention relates generally to the field of paintless applications and, more particularly, to an apparatus and process for applying a sealant bead to a paintless film edge.

2. Description of Related Art

Millions of dollars are presently spent each year painting and de-painting aircraft. Additionally, the hazardous materials associated with the paints and solvents used for such painting and de-painting contribute to polluting the environment.

A new paintless technology called "Applique" offers many advantages over paints and paint systems currently used. The new coating significantly reduces hazardous material use, cuts fuel cost, improves corrosion protection, and reduces aircraft weight growth.

The applique is basically a paint-replacement adhesive film which is applied to typically painted portions of an aircraft, similar to window tinting films applied to car windows. The film is applied in gores or patches with each successive layer slightly overlapped on the next.

One concern with the application technique of the applique is the tendency of the film edges to peel or tear apart under the extreme force of air rushing over the surface at high speeds. Despite the film being self-adhesive, the edges must still be reinforced with, for example, a sealant bead or edging. Testing has shown that the new paintless film, with a beaded edge, can successfully sustain flights at approximately twice the speed of sound.

Currently, the adhesive bead application includes using parallel bands of masking tape to form a narrow channel over the edge of the gore into which a sealant is applied. Subsequently, the sealant is skived. Intersecting corners must be done sequentially, after the first of the intersecting edges has cured. Covering an aircraft in this manner is very labor intensive and time consuming both of which greatly increases the cost of applying the film.

SUMMARY OF THE INVENTION

The present invention achieves technical advantages as an apparatus and method for securing an edge of a paintless type film gore. A fluid sealant material is striped along the edge of the gore using a striping apparatus. The striping apparatus comprises a serrated application wheel rotatably coupled to a housing which contains the fluid sealant. The sealant is transferred to the wheel for application to the gore as the wheel is rolled along the edge to be secured.

BRIEF DESCRIPTION OF THE DRAWINGS

For a more complete understanding of the present invention, reference is made to the following detailed description taken in conjunction with the accompanying drawings wherein:

FIG. 1 illustrates a gore of a paintless film applied to an area of an exemplary flow surface;

FIG. 2A illustrates a bead sealant striping apparatus in accordance with an exemplary embodiment of the present invention;

FIG. 2B illustrates a bead wheel in accordance with an embodiment of the present invention;

FIG. 4 illustrates a multiple wheel assembly head in accordance with another embodiment of the present invention.

DETAILED DESCRIPTION OF THE INVENTION

Figure 3:
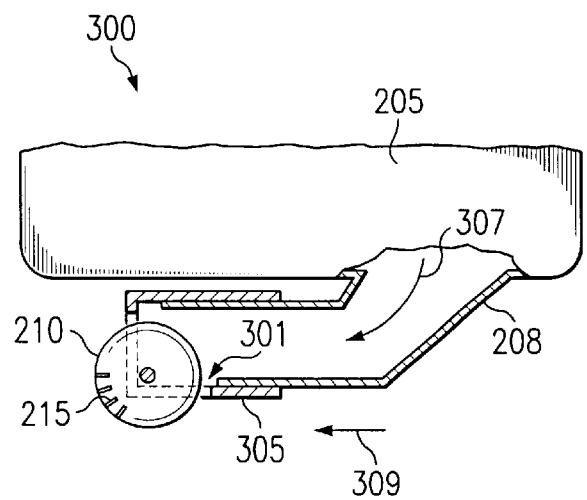
FIG. 3 illustrates another sealant bead striping apparatus in accordance with an exemplary embodiment of the present invention.

The numerous innovative teachings of the present application will be described with particular reference to the presently preferred exemplary embodiments. However, it should be understood that this class of embodiments provides only a few examples of the many advantageous uses and innovative teachings herein. In general, statements made in the specification of the present application do not necessarily delimit any of the various claimed inventions. Moreover, some statements may apply to some inventive features, but not to others.

Referring now to FIG. 1, there is illustrated a gore 105 of a paintless film applied to an area of an exemplary flow surface 110. The arrows indicate an exemplary air flow direction. The painless film has an adhesive backing for application to the flow surface 110. The preferred method of application would overlap the trailing edge of a gore over the leading edge of the one aft. While practical for initial applique application, subsequent repairs will almost always have exposed leading edge overlaps. In this illustration, the front edge 120 of the gore 105 would be the most vulnerable to peeling or tearing due to the force of the air flow, however, all edge are vulnerable to varying degrees. Generally, the adhesive backing is inadequate to prevent this type of peeling, thus, further reinforcement must be used to protect the integrity of the gore 105.

A technique in accordance with an embodiment of the present invention is to apply a trimming edge, bead, or stripe of sealant just at the edges of the gore 105. The bead of sealant is applied using an edge sealing apparatus in accordance with an embodiment of the present invention and the bead is subsequently cured. Curing can include applying an air flow and/or heat to the applied bead to accelerate the cure rate.

Referring now to FIG. 2A, there is illustrated a bead sealant striping apparatus 200 in accordance with an exemplary embodiment of the present invention. The sealant bead striping apparatus 200 includes a bead wheel 210 mounted in a housing 205. The wheel 210 is preferably of a width to coincide with that width of sealant needed to effectively secure the gore 105, typically $3/16$ inch to $1/4$ inch. The wheel 210 is rolled along the edges of the gore 105 and deposits a selected sealant in an even layer in a manner similar to applying a paint pin stripe to a car.

The housing 205 has a reservoir ramp 208 for guiding sealant to the bead wheel 210. The sealant is stored in the housing 205 and the housing 205 can be of a size to fit into a neck of a larger type container for storing sealant which is to be laid in the form of a bead by rolling the wheel 210 along the edge of a paintless film gore 105, for example. The sealant can include, for example, a one-component adhesive sealant with a viscosity of between 60 and 8000 centipoises and a two-part epoxy system ranging in viscosity between 60 to 8000 centipoises. As is well known, a variety of curable epoxy resin compositions are prepared by blending various types of epoxy resin, compounding resin and additives which vary widely in nature. In general, reactive diluents, plasticizers, solvents and other additives are selected to form compositions having an appropriate viscosity. The materials can be either room temperature cured or accelerated by means of applying heat or air as aforementioned.

In the past, various types of striping devices have been known for applying a paint stripe to a surface. These devices generally include a striper wheel which is journalled on a housing which is in communication with a container for housing paint. A representative prior art pin striper is exemplified by U.S. Pat. No. 1,988,710 the description of which is incorporated herein by reference. However, the prior art and paint pin striping devices are subject to certain shortcomings when used for applying sealants. For example, more viscous materials, such as a sealant, are not laid properly by the paint pin striper to form a sealant bead on an application surface.

In accordance with an embodiment of the present invention, the bead wheel 210 is rotationally mounted by a pin 211 and, as the wheel rotates, it comes in contact with sealant guided through the reservoir ramp from the housing 205 or container. Typical paint pin striping tools dispense paint onto a wheel as the wheel rotates and comes into close contact with a dispenser, however, such close contact does not allow a proper application, of more viscous materials such as sealants. In accordance with an embodiment of the present invention, the reservoir ramp 208 is sized (i.e. enlarged as a function of increased viscosity) to enable a proper flow of sealant to the bead wheel 210.

Referring now to FIG. 2B there is illustrated a bead wheel 210 in accordance with an embodiment of the present invention. The bead wheel 210 is configured with deep serrations 215 around the circumference. The serrations 215 act as small reservoirs and are filled with sealant as each serration 215 passes the reservoir ramp 208 (FIG. 2A). Subsequently, the sealant is transferred from the serrations 215 to the application surface as the wheel 210 is rolled.

Referring now to FIG. 3, there is illustrated another sealant bead striping apparatus 300 in accordance with an exemplary embodiment of the present invention. The sealant bead striping apparatus 300 includes the bead wheel 210 and housing 205 with reservoir ramp 208. The housing 205 contains the sealant which is applied as a bead to the gore edge 120 (FIG. 1). The housing 205 can be of a size to fit into or couple to a larger type sealant container. The sealant is guided from the housing 205 to the bead wheel 210 as indicated by arrow 307. Sealant is applied to the bead wheel 210 (into the serrations 215) as the bead striping apparatus 300 is rolled in the direction indicated by the arrow 309. As the wheel 210 turns, each serration 215 passes through an applicator gap 301 which applies the sealant. Subsequently, the sealant is transferred to the gore edge 120 as the serrations 215 make contact with the application surface.

The application gap 301 is sized to accommodate the viscous sealant material to enable a controllable consistent flow of sealant onto the bead wheel 210. For example, a more viscous sealant requires a larger gap distance than a less viscous sealant. The bead wheel 210 is mounted to a movable sleeve 305 which is coupled to the reservoir 208. The sleeve 305 can be adjusted along the reservoir in the direction of the arrow 309. Adjustment of the sleeve varies the gap distance in which the gap distance is increased for a higher viscosity and decreased for a lower viscosity.

To further improve consistent sealant bead application for various viscous sealants, the sealant bead striping apparatus 300 is also configured with replaceable bead wheels in which bead wheels with deeper serrations are used for higher viscosity sealants and more shallow serrations are used for lower viscosity sealants.

Referring now to FIG. 4, there is illustrated a multiple wheel assembly head 400 in accordance with another embodiment of the present invention. The head 400 is shown with three bead striping wheels, however, two or more than three can be used. Typically, round paintless film cutouts 130 (FIG. 1) are used to expose fastening devices, such as screws, which are exposed on the flow surface of an airplane wing, for example. The multiple wheel assembly head 400 is preferably used in such application to apply a sealant bead around a circular edge of the round cutout 130. Each wheel assembly includes a bead wheel 210 and reservoir 200 (as illustrated in FIG. 2A) coupled to a mounting plate 405.

Figure 5:
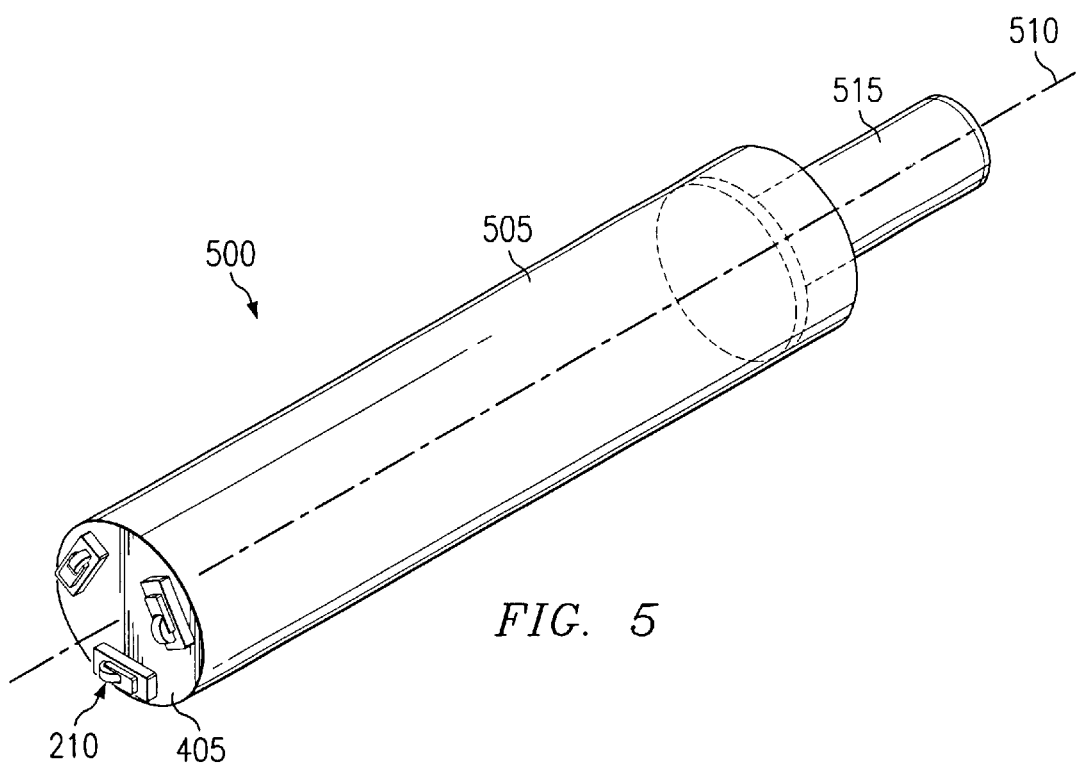
FIG. 5 illustrates a bead wheel striping apparatus in accordance with an exemplary embodiment of the present invention including the multiple wheel assembly head and a sealant container.

Referring now to FIG. 5, there is illustrated a bead wheel striping apparatus 500 in accordance with an exemplary embodiment of the present invention including the multiple wheel assembly head 400 and a sealant container 505. The head 400 is configured to couple to the sealant container 505 and to enable a sealant material to flow from the sealant container 505 to the reservoir of each bead wheel 210. The bead wheels 210 are coupled to the head 405 at equal distance from a center axis 510. Thus, as the wheels 210 are rolled around the gore 130 by a one-third turn or twist about the axis 510, a circular sealant bead is applied. A head configured with two wheels would require a one-half turn about the axis 510 to completely seal the edge of the round gore 130.

The striping apparatus 500 can also include a pressure member 515 for applying force to the sealant to assist with sealant flow to the bead wheel 210. The pressure member 515 includes a plunger head which sits inside the sealant container 505 and is slidably movable in a parallel direction with respect to the axis 510, for example. Additionally, the sealant container can be divided or separated by an inner wall so to accommodate a two-part epoxy system in which the two parts are combined in a chamber adjacent to the head 405 just before application to the bead wheel(s) 210.

Although a preferred embodiment of the method and system of the present invention has been illustrated in the accompanied drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. An apparatus for applying a sealant bead to an edge of a paintless film, said apparatus comprising:

a wheel having an outer periphery configured with serrations of a predetermined depth;

a wheel housing having a slot for rotatably mounting said wheel;

a reservoir having an inner portion for conducting a sealant to said wheel and coupled to said wheel housing; and an applicator integral with said wheel housing and cooperable with said reservoir for dispensing said sealant on said outer periphery of said wheel; and said wheel housing further including a sleeve adapted to slide over an outer portion of said reservoir, said sleeve enabling an operator to vary the dispense rate of said applicator by varying the distance between said outer periphery of said wheel and said applicator.

2. A sealant bead application apparatus comprising:

a plurality of wheels each having an outer periphery configured with serrations of a predetermined depth;

a wheel housing having a plurality of slots each for rotatably mounting a respective one of said plurality of wheels; and a reservoir having a inner portion for conducting a sealant material to said plurality of wheels, wherein said wheels apply said sealant to a circular edge of a paintless film; and an applicator for each of said plurality of wheels, wherein said applicator is configured to dispense said sealant material on said outer periphery of each respective wheel, wherein said applicator is located a distance from a respective wheel outer periphery; and said wheel housing further comprises an adjustment means for enabling an operator to vary said distance between said applicator and said respective wheel outer periphery, and wherein a dispense rate is increased as said distance is increased.

3. The apparatus of claim 2, wherein said plurality of wheels are located circumferentially about a rotational axis of said wheel housing, and wherein applying a partial rotation of said wheel housing about said rotational axis applies said sealant completely around said circular edge of said paintless film.

4. The apparatus of claim 2, wherein said applicator further comprises an adjustment means for varying said distance, and wherein a dispense rate is increased as said distance is increased.

5. The apparatus of claim 2, wherein each of said wheels further includes a width from $3/16$ to $1/4$ inches.

6. A device for applying a circular stripe of striping material about a rotational axis, the device comprising:

a central reservoir having an inner portion adapted to store a striping material;

a housing coupled to a first end of said central reservoir, said housing comprising;

a plurality of wheel stripe assemblies, each of said wheel stripe assemblies having a rotatably mounted stripe wheel with an outer periphery and having a secondary reservoir for receiving the striping material from said central reservoir and dispensing the striping material to said stripe wheel outer periphery, wherein all of said wheel stripe assemblies are located on said housing about a center line which is perpendicular to a plane of said housing, and all said wheel stripe assemblies are located on said housing an equal distance from said center line.

7. The device of claim 6, wherein each of said wheel stripe assemblies further including a wheel mount adapted to rotatably secure said wheel and having a sleeve portion adapted to be received by said secondary reservoir, said sleeve portion and said secondary reservoir are cooperable to vary the dispensing rate of said striping material to said stripe wheel outer periphery.

8. The device of claim 6, wherein said plurality of wheel stripe assemblies comprises at least three wheel stripe assemblies.

* * * * *